Patented Aug. 8, 1950

2,518,247

UNITED STATES PATENT OFFICE 2,518,247

COATING POPCORN

Travis D. Nairn, Dolton, Ill.

No Drawing. Application August 23, 1947,
Serial No. 770,335

4 Claims. (Cl. 99—81)

This invention relates to a preparation for coating popcorn.

An object of the invention is to provide a preparation for coating kernels of popcorn which tends to seal the kernels against the loss or gain of moisture and which, when the corn is popped, results in the addition of flavoring and coloring material to the popped corn. Popcorn kernels frequently are packaged in small quantities for the retail market in cans, cartons and glassine or cellophane bags. Upon popping the corn domestically, the purchaser usually adds salt and melted butter or other flavoring to corn while commercial corn poppers frequently add salt and artificial butter flavoring and coloring matter. By the improvements herein described, salt, flavoring materials, and preferably a coloring material are added to the corn kernels in the form of an adhering coating before the corn is packaged for distribution and sale and whereby the corn, when later popped comes from the popping receptacle preferably in a salted, flavored, and colored condition ready for eating.

In the addition of salt and flavoring materials, as well as a coloring agent to the corn kernels preparatory to packaging the same, preferably I prepare a mixture containing salt (in a finely divided state), a flavoring agent such s an arificial butter flavor that is not highly volatile, a coloring agent to give the popped corn a conventional buttered appearance and a carrier or bonding agent for the above which is sufficiently adherent to cause the composition to coat the kernels, the bonding material preferably serving to seal the kernels against loss or gain of moisture during storage while the coating insures that each kernel will carry the proper proportion of salt and other materials of which the coating is composed.

The carrier or bonding agent referred to preferably is an edible oil, that is, a vegetable oil or an animal fat. Corn oil, cottonseed oil and coconut oil are examples of oils that may be used. A mixture of edible vegetable oils or suitable animal fats may be used. However, a vegetable oil that is liquid at normal temperatures is preferred.

In preparing the coating material that has been found most suitable, a mixture is formed of finely divided salt, sometimes called popcorn salt, a coloring material, a flavoring agent and a vegetable oil. Suitable proportions of the coating material are as follows: salt—100 lbs., coloring material—1½ ozs., flavor (as much as is required) but where an artificial butter flavor of commercial strength is used about 33 ozs., and 5 lbs. of vegetable oil. These ingredients of the coating composition are, except for the salt, preferably in liquid form and are thoroughly mixed together and added to the salt, the whole being thoroughly stirred. The composition is then added to a batch of corn having the proper moisture content for assuring maximum popping characteristics. About 1 oz. of the coating composition is added to 1 lb. of corn and the mixture thoroughly stirred or agitated to effect the coating of each kernel with the composition. Other techniques may be employed for covering the kernels with the coating material. The prepared corn is then ready for packaging in cans, bags or the like for distribution and sale.

The oil used in the composition forms a film over each kernel that inhibits change in the moisture content of the corn and, by reason of the adherent action of the oil and the thorough mixing of the coating ingredients, the oil retains a proper proportion of the other coating components on each kernel, including salt, flavoring and coloring material where all such are employed. A user of the coated popcorn, upon popping the same, obtains popped kernels that are uniformly salted, colored, and flavored. Generally, corn having a moisture content of about 12% has been found most satisfactory insofar as high popping characteristics are concerned and the coating composition, particularly the oil constituent thereof, tends to inhibit changes in the moisture content and thus retards deterioration of the popping qualities of the coated corn when stored for a considerable period.

The coloring material referred to above preferably is a U. S. certified food coloring and is added to the other coating components in liquid form to facilitate uniform distribution throughout the mix. A butter color is desirable generally where the popped corn is to have a butter flavor and is the color preferably selected for use in conjunction with an artificial butter flavor. Such artificial butter flavor materials are well known and frequently contain diacetyl and other ketones and acids and frequently contains an anti-rancidity agent. The use of such an agent in the flavoring material employed in the coating composition generally is of advantage since it inhibits the development of rancidity in the oil where storage of the coated corn for a considerable period prior to use is likely or is contemplated.

Artificial butter flavor and color materials have been specifically referred to above as components of the preferred coating composition due to the common use of melted butter on domestically popped corn which not only flavors the corn but incidentally colors it also, at least to some extent. Likewise, artificial butter flavor and coloring materials frequently are employed by commercial corn poppers but it is within the contemplation of this invention that other flavoring and coloring materials may be employed, if desired, for giving the popped corn special or unusual flavor and color.

Corn coated in accordance with the above improvements is best popped in a vessel containing a small quantity of oil or equivalent fat heated to a popping temperature which usually is from 350 to 380° F. The heat of the oil in the popping vessel releases the coating composition from the exterior of the corn kernels and the components thereof, mixing with the hot popping oil, are picked up sufficiently by the popped corn or flakes thereof as the corn is popped so that the batch of popped corn is uniformly salted, flavored, and colored.

As indicated above, color and flavor components other than the preferred butter color and butter flavor materials may be incorporated in a coating composition within the concept of the present invention. For example, an approved strawberry flavoring material and an approved strawberry coloring material that are soluble in hot oil may be sprayed on or otherwise applied to the kernels as a coating whereby, when the coated corn is placed in the hot oil of a popping vessel, the coating will be released from the hulls and will be picked up by the popped flakes as the kernels pop, thus coloring and flavoring the popped corn. Salt or other materials may be employed as ingredients in such a coating composition, if desired.

While I have disclosed specifically the preferred components of the coating composition variations thereof, as well as in the technique of applying it to the unpopped corn, may be resorted to within the spirit of the improvements defined by the appended claims.

I claim:

1. The method comprising inhibiting during storage any substantial change in the moisture-content of unpopped corn kernels having a moisture-content insuring optimum popping characteristics by coating the unpopped corn kernels with a composition containing a coating base selected from the group consisting of edible vegetable and animal fats and oils; salt, and a flavoring ingredient, said coating base bonding the salt and flavoring ingredient to the exterior surfaces of the corn kernels, and thereafter storing the so-coated unpopped corn kernels until they are ready for use.

2. The method comprising inhibiting during storage any substantial change in the moisture-content of unpopped corn kernels having a moisture-content insuring optimum popping characteristics by coating the unpopped corn kernels with a composition containing a coating base selected from the group consisting of edible vegetable and animal fats and oils; salt, and a flavoring ingredient, said coating base bonding the salt and flavoring ingredient to the exterior surfaces of the corn kernels, storing the so-coated unpopped kernels of corn until they are ready for popping, said coating sealing the unpopped corn kernels against loss of moisture during storage, and popping said corn kernels in a hot edible oil bath wherein said coating material is released by the kernels to the oil to flavor the flakes of corn as the kernels pop within the oil.

3. The method of claim 1 wherein the coating base is an edible vegetable oil.

4. The method comprising inhibiting during storage any substantial change in the moisture-content of unpopped corn kernels having a moisture-content insuring optimum popping characteristics by coating the unpopped corn kernels with a composition containing a vegetable oil, commercial artificial butter color, commercial artificial butter flavoring material, and salt in finely divided form, the proportions of said ingredients being substantially as follows:

| | | |
|---|---|---|
| Vegetable oil | lbs | 5 |
| Artificial butter color | oz | 1½ |
| Artificial butter flavor | oz | 33 |
| Salt | pounds | 100 | and thereafter storing the so-coated unpopped kernels until they are ready for use.

TRAVIS D. NAIRN.

REFERENCES CITED

The following references are of record in the file of this patent:

UNITED STATES PATENTS

| Number | Name | Date |
|---|---|---|
| 1,658,486 | Howe | Feb. 7, 1928 |
| 2,240,759 | Chandler | May 6, 1941 |

OTHER REFERENCES

"Pop Corn for the Home," by C. P. Hartley and J. G. Willier, U. S. Department of Agriculture, Farmers' Bulletin 553, Washington, Government Printing Office, 1917.